(12) United States Patent
Sajima (10) Patent No.: US 6,685,456 B2
(45) Date of Patent: Feb. 3, 2004

(54) GOLF BALL MOLD

(75) Inventor: Takahiro Sajima, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 180 days.

(21) Appl. No.: 09/991,658

(22) Filed: Nov. 26, 2001

(65) Prior Publication Data

US 2002/0094886 A1 Jul. 18, 2002

(30) Foreign Application Priority Data

Nov. 27, 2000 (JP) ........................................ 2000-358647

(51) Int. Cl.⁷ ............................ B29C 45/14; B29C 70/70
(52) U.S. Cl. ...................................... 425/116; 425/120
(58) Field of Search ............................... 425/116, 120, 425/125

(56) References Cited

U.S. PATENT DOCUMENTS

| | | | | |
|---|---|---|---|---|
| 1,595,409 | A | * 8/1926 | Kerr | ............................. 425/12 |
| 4,653,758 | A | 3/1987 | Solheim | ....................... 264/239 |
| 5,688,193 | A | * 11/1997 | Kasasima et al. | ........... 425/116 |
| 5,827,135 | A | * 10/1998 | Shimosaka et al. | ......... 473/379 |
| 5,874,038 | A | 2/1999 | Kasashima et al. | ......... 425/116 |
| 6,123,534 | A | 9/2000 | Kasashima et al. | ......... 425/116 |
| 6,540,625 | B2 | * 4/2003 | Sajima | ........................ 473/383 |
| 2001/0027141 | A1 | * 10/2001 | Sajima | ........................ 473/378 |

FOREIGN PATENT DOCUMENTS

| | | | | |
|---|---|---|---|---|
| JP | 61-173907 | | 8/1986 | |
| JP | 05329231 | A * | 12/1993 | ........... A63B/45/00 |
| JP | 8-173576 | | 7/1996 | |
| JP | 09048027 | A * | 2/1997 | ........... B29C/33/38 |
| JP | 09066120 | A * | 3/1997 | ........... A63B/37/00 |
| JP | 2001187172 | A * | 7/2001 | ........... A63B/45/00 |

\* cited by examiner

Primary Examiner—Robert Davis
(74) Attorney, Agent, or Firm—Birch, Stewart, Kolasch & Birch, LLP

(57) ABSTRACT

A golf ball mold comprises an upper portion (1) and a lower portion (3). A large number of projections (7) for dimple formation are provided on a cavity surface (5) of each of the upperportion (1) and the lower portion (3). The joining surface of the upper portion (1) and the lower portion (3) has a concavo-convex shape. In each of the upper portion (1) and the lower portion (3), each of the numbers of convex and concave sections is three to five. Each of the convex sections has two to eight projections (7) on a first line from the joining surface. At least one of the projections (7) on the first line from the joining surface in each of the convex sections is constituted such that an equation (I) is established:

$$R \times 0.8 \leq L \leq R \times 1.2 \qquad (I).$$

In the equation (I), R represents a radius of the projection (7) and L represents a linear distance in a vertical direction between a center of the projection (7) and the joining surface.

5 Claims, 7 Drawing Sheets

GOLF BALL MOLD

BACKGROUND OF THE INVENTION

1. Field of the Invention

The present invention relates to a golf ball mold.

2. Description of the Related Art

A golf ball has 300 to 550 dimples on a surface thereof. The role of the dimples resides in one aspect that such dimples disturb an air stream around the golf ball during the flight of the golf ball to accelerate the transition of a turbulent flow over a boundary layer, thereby causing a turbulent flow separation (which will be hereinafter referred to as a "dimple effect"). The acceleration of the transition of the turbulent flow causes a separating point of air from the golf ball to be shifted backwards so that a pressure resistance is reduced, resulting in an increase in the flight distance of the golf ball. Moreover, the acceleration of the transition of the turbulent flow increases a differentia between upper and lower separating points of the golf ball which is generated by a back spin. Consequently, a lift acting on the golf ball is increased.

Usually, the golf ball is formed by a mold comprising upper and lower portions having hemispherical cavities respectively. Assuming that the upper cavity is the Northern Hemisphere of a globe and the lower cavity is the Southern Hemisphere of the globe, the upper and lower portions are joined to each other over an equatorial plane (a plane including an equator). The inner peripheral surface of the mold is provided with a large number of projections. By the projections, dimples are formed on the surface of the golf ball. In other words, the shape of the dimple is obtained by inverting the shape of the projection.

A molding material (for example, a synthetic resin) leaks out of the joining portion of the upper and lower portions. Therefore, a spew is generated in a region corresponding to the equator on the surface of the golf ball. The spew is ground and removed by means of a grindstone. When the spew is generated in the dimple, it is removed with difficulty. In many cases, the dimple is not formed on the equator in order to easily remove the spew. More specifically, a projection is not provided on the joining region of the mold in many cases. Consequently, a great circle path to be a great circle which does not cross the dimple is formed on the surface of the golf ball. When the great circle path is coincident with a portion having the highest peripheral speed of a back spin (which will be hereinafter referred to as the "highest speed portion"), the sufficient dimple effect cannot be obtained and a flight distance is insufficient. Furthermore, in the case in which the great circle path and the highest speed portion are coincident with each other and the case in which they are not coincident with each other, the different dimple effects are obtained. Therefore, the aerodynamic symmetry of the golf ball is deteriorated. In some cases, the dimple provided in the vicinity of the great circle path is slightly deformed during the removal of a spew. If the deformation is caused, the dimple effect becomes more insufficient when the great circle path and the highest speed portion are coincident with each other.

Japanese Laid-Open Patent Publication No. Sho 62-47379 (1987/47379, U.S. Pat. No. 4,653,758), Japanese Laid-Open Patent Publication No. Hei 8-173576 (1996/173576,) and Japanese Laid-Open Patent Publication No. Hei 11-137727 (1999/137727, U.S. Pat. No. 6,123,534) have disclosed a golf ball mold in which upper and lower portions include convex and concave sections respectively and the joining surface of the upper and lower portions has a concavo-convex shape. In such a mold, a concavo-convex spew is generated. Accordingly, also in the case in which a projection for forming the dimple is provided on an equator, the spew can be generated by keeping away from the dimple. Accordingly, the spew can be removed comparatively easily. However, if the projection is positioned on the joining surface in the mold, the spew is generated in the dimple. In order to remove the spew, the projection is to be provided by keeping away from the joining surface. As a result, a large number of band-shaped smooth area (in which the dimple is not present) are generated along the joining surface in the golf ball thus obtained. The band-shaped smooth area is a comparatively large and is not coincident with the equator but is intensively provided in the vicinity of the equator, and furthermore, is extended in almost parallel with the equator. Accordingly, when the equator is coincident with the highest speed portion of the back spin, the dimple effect cannot be obtained sufficiently.

Japanese Laid-Open Patent Publication No. Sho 61-173907 (1986/173907) has disclosed a golf ball mold in which a projection for forming a dimple is provided on an equator and convex and concave sections are alternately arranged at a pitch for one projection. Since a joining surface is wavy in the golf ball mold, a band-shaped smooth area is rarely generated on the golf ball. However, it is necessary to provide a very large number of convex and concave sections in the mold. Therefore, it is hard to manufacture the mold.

Japanese Laid-Open Patent Publication No. Hei 10-127826 (1998/127826, U.S. Pat. No. 5,874,038) has disclosed a golf ball mold in which a flat surface coincident with an equatorial plane is provided between convex and concave sections. The mold is used for injection molding and a gate for injecting a material is provided on the flat surface. In the mold, the flat surface is provided between projections which are adjacent to each other over the equatorial plane. Therefore, a space between the projections cannot be reduced so that the degree of freedom of a dimple pattern design is deteriorated. Moreover, the joining surface of upper and lower portions has a double step. Therefore, it takes a great deal of time and labor to manufacture the mold.

In consideration of such actual circumstances, it is an object of the present invention to provide a golf ball mold by which a golf ball having an excellent aerodynamic characteristic can be obtained and can easily be manufactured.

SUMMARY OF THE INVENTION

In order to attain the above-mentioned object, the invention provides a golf ball mold comprising upper and lower portions having a large number of projections for dimple formation on cavities thereof, wherein each of the upper and lower portions includes a convex section and a concave section which are alternately provided such that a joining surface to the other has a concavo-convex shape, each of the numbers of the convex sections of the upper portion, the concave sections of the upper portion, the convex sections of the lower portion and the concave sections of the lower portion is three to five, each of the convex sections has two to eight projections on a first line from the joining surface, and at least one of the projections on the first line from the joining surface in each of the convex sections is constituted such that an equation (I) is established:

$$R \times 0.8 \leq L \leq R \times 1.2 \qquad (I)$$

(In the equation (I), R represents a radius of the projection and L represents a linear distance in a vertical direction between a center of the projection and the joining surface).

In a golf ball obtained by the mold, a large band-shaped smooth area is not present. In addition, also in the case in which the edge of a dimple is deformed by removing a spew, a deformed portion is not arranged along a great circle. Accordingly, the golf ball is excellent in an aerodynamic characteristic. Moreover, the mold can be manufactured comparatively easily, and furthermore, a dimple pattern design is less restricted.

It is preferable that the projection should be provided such that a surface of a golf ball to be molded has no great circle path to be a great circle which does not cross a dimple. A golf ball obtained by the mold has a more excellent aerodynamic characteristic.

It is preferable that a gate for injecting a molding material should be provided in a position where the joining surface crosses an equatorial plane. Although the mold is used for injection molding, it has a high degree of freedom of a dimple pattern design and can be manufactured easily.

It is preferable that a joining surface to the other in each of the upper and lower portions should have a convex surface present in the convex section in almost parallel with an equatorial plane, a concave surface present in the concave section in almost parallel with the equatorial plane, and a boundary surface positioned between the convex surface and the concave surface. All the convex surfaces have areas equal to each other, all the concave surfaces have areas equal to each other, and the convex and concave surfaces have areas equal to each other. In the mold, pressurizing force generated when molding a golf ball is uniformly dispersed over the mold. Therefore, the golf ball thus obtained has a uniform quality.

It is preferable that a difference in a height between the highest convex section and the lowest concave section should be 2.0 mm or less in each of the upper and lower portions. The mold can easily be manufactured and a golf ball can easily be taken out of the mold after molding.

DESCRIPTION OF THE PREFERRED EMBODIMENTS

The present invention will be described below in detail based on a preferred embodiment with reference to the drawings.

Figure 1:
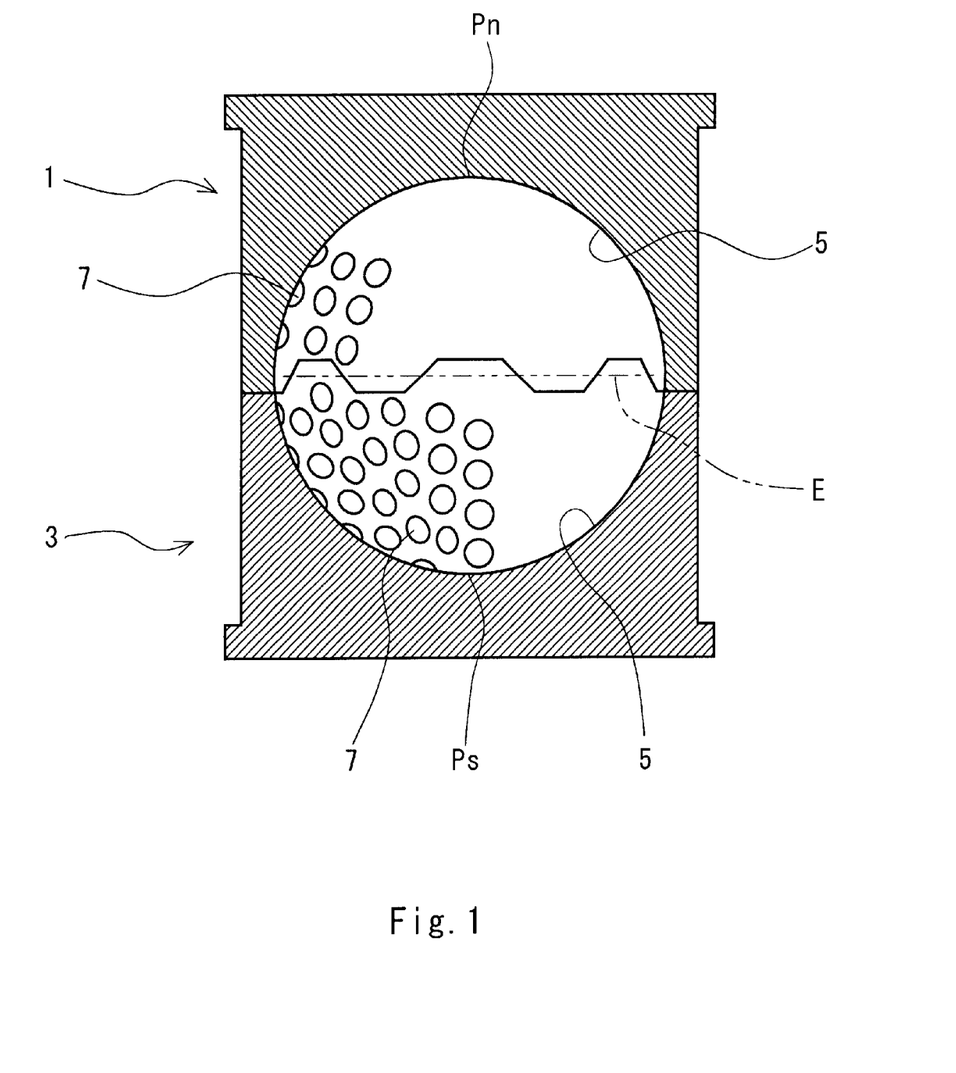
FIG. 1 is a sectional view showing a golf ball mold according to an embodiment of the present invention.

A mold shown in FIG. 1 comprises an upper portion 1 and a lower portion 3. By joining the upper portion 1 to the lower portion 3, a spherical cavity is formed. By the cavity, a golf ball is molded. A large number of projections 7 are provided on a cavity surface 5 of each of the upper portion 1 and the lower portion 3. The projection 7 has a circular contour. By the projection 7, a dimple is formed on the surface of the golf ball. As is apparent from FIG. 1, the joining surface of the upper portion 1 and the lower portion 3 (where the upper portion 1 comes in contact with the lower portion 3 when they are clamped) has a concavo-convex shape. In FIG. 1, a two-dotted line indicated as E is an equator in which the uppermost portion of the cavity surface 5 of the upper portion 1 is assumed to be a north pole Pn of a glove and the lowermost portion of the cavity surface 5 of the lower portion 3 is assumed to be a south pole Ps of the globe. A plane including the equator E is an equatorial plane.

Figure 2:
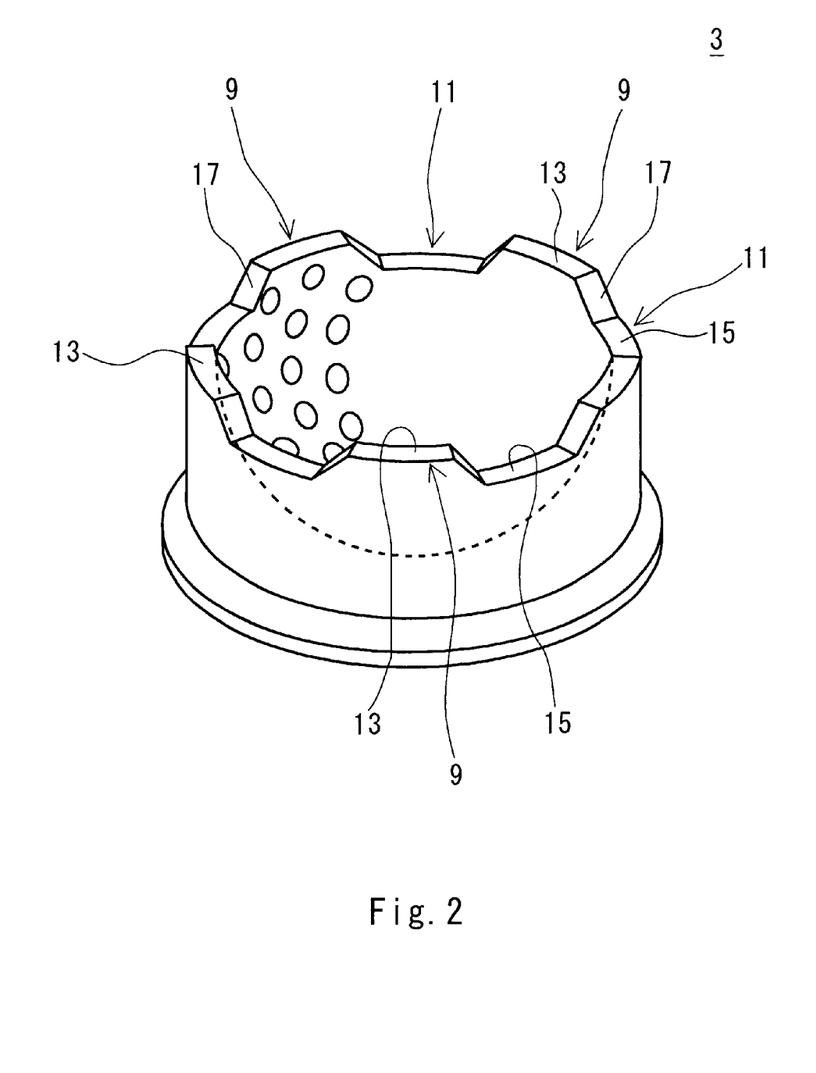
FIG. 2 is a perspective view showing the lower portion of the mold in FIG. 1.

FIG. 2 is a perspective view showing the lower portion 3 of the mold in FIG. 1. The lower portion 3 includes five convex sections 9 and five concave sections 11. The convex section 9 is protruded from the equator E. The concave section 11 is recessed from the equator E. The convex section 9 and the concave section 11 are alternately provided. The upper portion 1 also includes five convex sections 9 and five concave sections 11, which is not shown. The convex section 9 of the lower portion 3 is fitted in the concave section 11 of the upper portion 1, and the convex section 9 of the upper portion 1 is fitted in the concave section 11 of the lower portion 3. By the fitting, the spherical cavity is formed as described above and the joining surface of the upper portion 1 and the lower portion 3 has a concavo-convex shape.

As described above, the convex section 9 and the concave section 11 are alternately provided. In the lower portion 3, therefore, the number of the convex sections 9 is equal to that of the concave sections 11 (five in this example). The convex section 9 of the lower portion 3 is fitted in the concave section 11 of the upper portion 1. Therefore, the number of the concave sections 11 of the upper portion 1 is equal to that of the convex sections 9 of the lower portion 3. The convex section 9 of the upper portion 1 is fitted in the concave section 11 of the lower portion 3. Therefore, the number of the convex sections 9 of the upper portion 1 is equal to that of the concave sections 11 of the lower portion 3. More specifically, in the mold, the numbers of the convex sections 9 of the upper portion 1, the concave sections 11 of the upper portion 1, the convex sections 9 of the lower portion 3 and the concave sections 11 of the lower portion 3 are equal to each other.

In the lower portion 3, the joining surface with the upper portion 1 includes a convex surface 13, a concave surface 15 and a boundary surface 17. The convex surface 13 is provided in the convex section 9 in almost parallel with the equatorial plane. The concave surface 15 is provided in the concave section 11 in almost parallel with the equatorial plane. The boundary surface 17 is positioned between the convex surface 13 and the concave surface 15. In the lower portion 3, the boundary surface 17 has an upper half portion present in the convex section 9 and a lower half portion present in the concave section 11. While the boundary surface 17 is inclined obliquely to the equatorial plane in the embodiment, the boundary surface may be a plane extended in a vertical direction. While the convex surface 13, the concave surface 15 and the boundary surface 17 are planes in the lower portion 3, they may be curved. The joining surface of the upper portion 1 also includes the convex surface 13, the concave surface 15 and the boundary surface 17.

It is preferable that the area of the convex surface 13 should be equal to that of the concave surface 15 in the lower portion 3. Since the concave surface 15 of the upper portion 1 abuts on the convex surface 13 of the lower portion 3, both of them have equal areas. Moreover, since the convex surface 13 of the upper portion 1 abuts on the concave surface 15 of the lower portion 3, both of them have equal areas. In the lower portion 3, the area of the convex surface 13 is equal to that of the concave surface 15. In the mold, therefore, the areas of all the convex surfaces 13 are equal to each other and the areas of all the concave surfaces 15 are equal to each other. More specifically, the areas of all the convex surfaces 13 and those of all the concave surfaces 15 which are included in the mold are equal to each other. While the mold is pressurized by means of a press when molding the golf ball, all of the convex surfaces 13 and concave surfaces 15 have equal areas so that pressurizing force is uniformly dispersed. Consequently, a variation in a dimension and a physical property value for each region in one golf ball is suppressed. In order to uniformly disperse the pressurizing force during the molding, it is preferable that the heights of all the convex surfaces 13 should be equal to each other, that is, the depths of all the concave surfaces 15 should be equal to each other.

Figure 3:
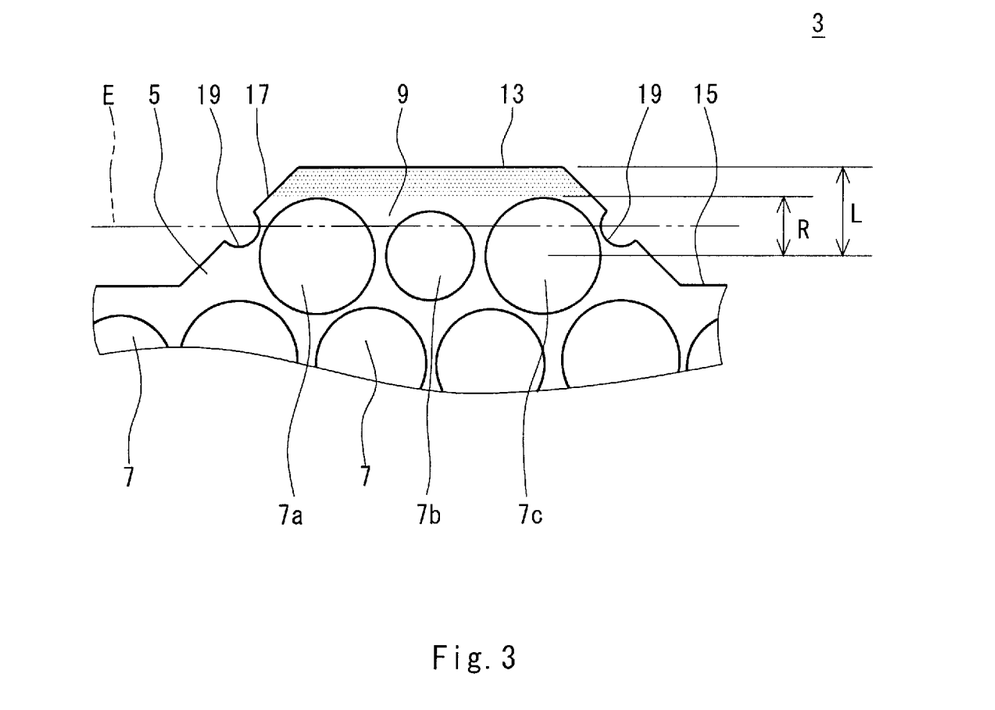
FIG. 3 is an enlarged view showing a part of the lower portion in FIG. 2.

FIG. 3 is an enlarged view showing a part of the lower portion 3 in FIG. 2. In FIG. 3, the cavity surface 5 of the lower portion 3 is shown. While the lower portion 3 will be described below in detail, the structure of the upper portion 1 is the same as that of the lower portion 3. Three projections 7a, 7b and 7c shown in FIG. 3 are present in the convex section 9 (that is, a portion provided above the equator E) and are provided on a first line from the joining surface (the convex surface 13). The projection 7 present in the convex section 9 is defined to be included wholly or partially in the convex section. A segment extended from a center of the projection 7 on the first line to the joining surface of the convex section 9 in a vertical direction does not cross the other projection 7.

When molding the golf ball, a spew is generated on the joining surface. In order to remove the spew, the projection 7 is not formed on the joining surface. As a result, a band-shaped smooth region is generated in the vicinity of the joining surface. A dotted portion indicates the band-shaped smooth region in FIG. 3. The band-shaped smooth region concentrates in the vicinity of the equator E, and furthermore, is extended in almost parallel with the equator E. Accordingly, if the band-shaped smooth region is large, the dimple effect becomes insufficient when the equator is coincident with the highest speed portion of the back spin. If the number of the convex sections 9 (the number of the concave sections 11) in the lower portion 3 is three or more, the area of each band-shaped smooth region is not greatly increased. Accordingly, it is possible to prevent the dimple effect from being reduced when the equator is coincident with the highest speed portion of the back spin. In respect of the suppression of a reduction in the dimple effect, it is more preferable that the number of the convex sections 9 is greater. However, if the number is too great, it is hard to manufacture the mold. Therefore, the number of the convex sections 9 is set to be five or less.

The number of the projections 7 on the first line which are present in one convex section 9 is two to eight. If the same number is less than two, the area of the band-shaped smooth region is increased. In some cases, consequently, the dimple effect becomes insufficient when the equator is coincident with the highest speed portion of the back spin. From this viewpoint, it is preferable that the number of the projections 7 should be three or more. If the same number is more than eight, the size of each dimple is reduced so that the flight distance of the golf ball is decreased in some cases. In this respect, it is preferable that the number of the projections 7 should be six or less.

In FIG. 3, an arrow R indicates a radius of the projection (the projection 7c in the example of the drawing) on the first line which is present in the convex section 9. Moreover, an arrow L indicates a linear distance in a vertical direction between the center of the projection 7c and the joining surface (the convex surface 13). The distance L is measured over a projecting plane shown in FIG. 3. In the case in which the boundary surface 17 is present in the vertical direction with respect to the center of the projection 7c, a distance between the center of the projection 7 and the intersecting point of a straight line extended in the vertical direction from the center of the projection 7 and the boundary surface 17 is set to L. At least one of the projections 7 on the first line which are present in the respective convex sections 9 is arranged such that the distance L is 0.8 to 1.2 times as great as the radius R. If the distance L is 0.8 time as great as the radius R or more and is less than the radius R, the projection 7 crosses the convex surface 13. In this case, a portion of the projection 7 which is protruded from the convex section 9 is missed. Accordingly, a part of the dimple formed by the projection 7 is also missed. If the distance L is equal to the radius R, the projection 7 comes in contact with the convex surface 13. If the distance L is more than the radius R and is 1.2 times as great as the radius R or less, a small smooth region is present between the projection 7 and the convex surface 13. By setting the distance L to be 0.8 to 1.2 times as great as the radius R, it is possible to prevent an appearance from being deteriorated by considerably missing the dimple, and furthermore, to prevent an aerodynamic characteristic from being reduced due to a smooth region having a large area. From this viewpoint, it is preferable that the distance L should be 0.8 to 1.0 time as great as the radius R. In respect of the suppression of the reduction in the appearance, it is preferable that the width of the missed portion in the projection 7 (a linear distance in the vertical direction) should be ⅕ of the radius R or less.

As is apparent from FIG. 3, the projections 7a, 7b and 7c cross the equator E. Accordingly, the golf ball obtained by using the mold does not have a great circle path along the equator E. By devising the arrangement of the projection 7 in a region other than the vicinity of the equator E, it is possible to obtain a golf ball having no great circle path. The golf ball having no great circle path is excellent in the aerodynamic characteristic. As a matter of course, the equator E or another portion may be the great circle path. Also in this case, the use of the mold according to the present invention can avoid the coincidence of a portion where the dimple is deformed by removing a spew with the great circle path.

Moreover, there is also a golf ball employing a method in which a hemisphere is divided into a plurality of units (which are spherical isosceles triangles) through a plurality of comparting lines, each of the comparting lines being a circular arc along the longitude of a globe, having a length of a quarter of the length of the great circle and having one of ends positioned on a pole, and the dimple patterns of all the units are identical to each other. Such a method is referred to as a "hemisphere repetition arranging method". In the hemisphere repetition arranging method, the aerodynamic symmetry of the golf ball tends to be damaged. The mold shown in FIG. 1 is used to form a golf ball in which a great circle path is not present in the equator E. Even if a dimple is arranged by the hemisphere repetition arranging method, consequently, the aerodynamic symmetry can be enhanced. In order to mold a golf ball in which a dimple is arranged by the sphere repetition arranging method, it is preferable that the number of the convex sections 9 in each of the upper and lower portions 1 and 3 should be equal to the number of the units in the hemisphere or a double of the number of the units in the hemisphere. Consequently, the aerodynamic symmetry of the golf ball can be more enhanced and the manufacturing cost of the mold can be reduced.

In each of the upper and lower portions 1 and 3, it is preferable that a difference between the heights of the highest convex section 9 and the lowest concave section 11 (a maximum step) should be 2.0 mm or less. A mold having a maximum step of 2.0 mm or less is manufactured with less difficulty and the golf ball can be taken out (removed from the mold) easily after the molding. From this viewpoint, it is particularly preferable that the maximum step should be 1.5 mm or less. If the maximum step is too small, the band-shaped smooth region closes the equator E so that the aerodynamic characteristic of the golf ball is deteriorated. Accordingly, it is preferable that the maximum step should be 0.2 mm or more, furthermore 0.5 mm or more, and particularly 1.0 mm or more. If the convex surface 13 is curved, the height of the highest portion of the convex surface 13 is set to be the height of the convex section 9. If the concave surface 15 is curved, the height of the lowest portion of the concave surface 15 is set to be the height of the concave section 11.

As shown in FIG. 3, a gate 19 is provided on the boundary surface 17. The gate 19 is formed by scraping the boundary surface 17. The gate 19 is a path for injecting a material into a cavity. Usually, the gate 19 has a circular section. The gate 19 shown in FIG. 3 has a semicircular section, and a residual semicircular portion is provided on the boundary surface 17 of the upper portion 1. By joining the upper portion 1 to the lower portion 3, one gate 19 having a circular section is formed. The gate 19 is positioned on the equator E such that the supply of the molding material to the cavity of the upper portion 1 and that of the molding material to the cavity of the lower portion 3 are uniformly carried out. More specifically, the gate 19 is provided in a position where the boundary surface 17 (joining surface) crosses the equatorial plane.

The gate may be provided to penetrate through the lower end of the convex section 9. In this case, the degree of freedom of the arrangement of the projections 7 present in the convex section 9 is restricted. As disclosed in Japanese Laid-Open Patent Publication No. Hei 10-127826 (1998/127826), moreover, the boundary surface 17 may be constituted by two inclined planes and one horizontal plane and a gate may be formed on the horizontal plane. In this case, it takes a great deal of time and labor to process a joining surface. As shown in FIG. 3, accordingly, it is the most preferable that all the gates 19 should be provided on the boundary surface 17 to be a single plane. While an injection mold requires the gate 19 for injecting a molding material, a compression mold does not require the gate 19.

Figure 4:
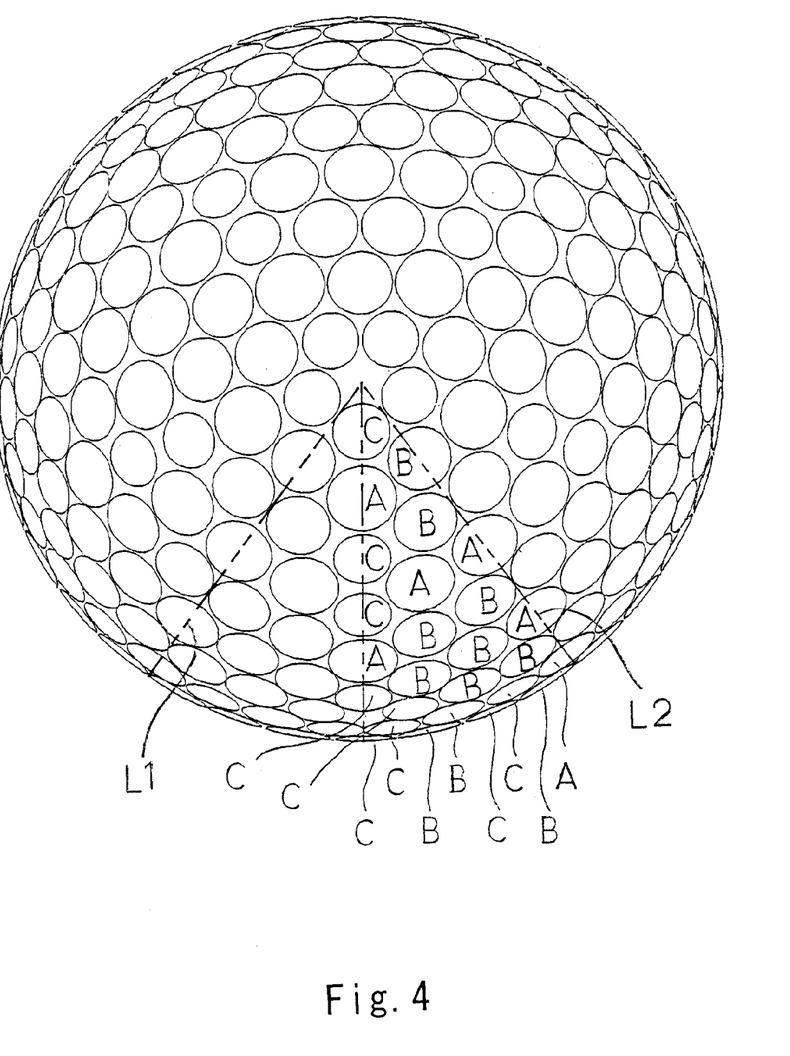
FIG. 4 is a plan view showing a golf ball according to the embodiment of the present invention.
Figure 5:
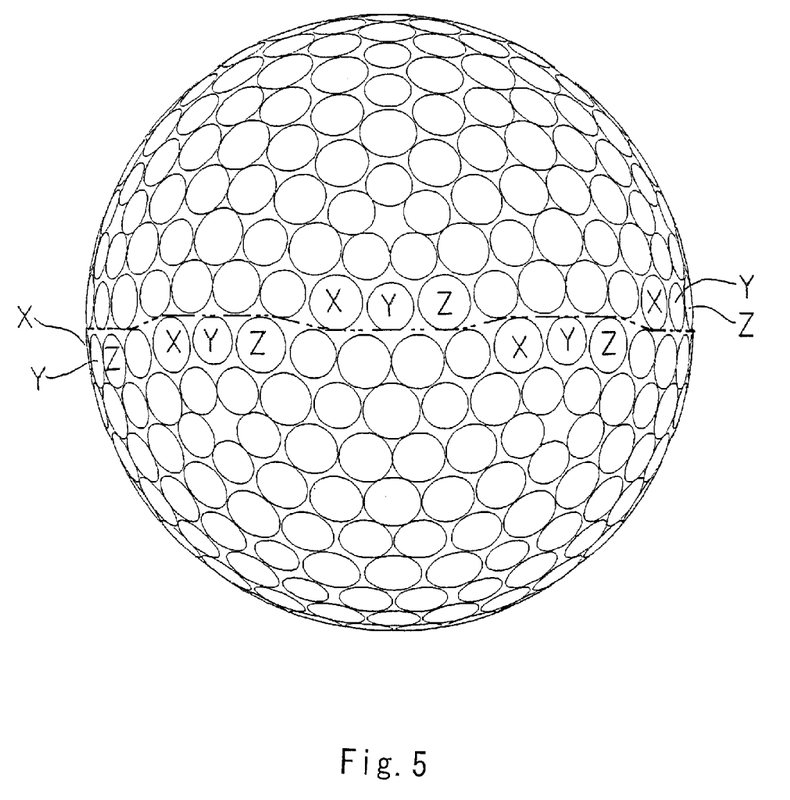
FIG. 5 is a front view showing the golf ball in FIG. 4.

FIG. 4 is a plan view showing a golf ball according to an embodiment of the present invention. Moreover, FIG. 5 is a front view showing the golf ball. The golf ball has 70 A dimples having a diameter of 4.1 mm, 210 B dimples having a diameter of 3.80 mm, and 130 C dimples having a diameter of 3.35 mm. The total number of the dimples is 410. The dimple pattern of the golf ball is arranged by the hemisphere repetition arranging method. The number of units for each hemisphere is five. In FIG. 4, a region between segments L1 and L2 acts as one unit. The dimple pattern in the unit is mirror symmetrical. FIG. 4 shows the kind of dimples in a further half region of one unit.

The golf ball is formed by a mold in which the joining surface of upper and lower portions has a concavo-convex shape. A two-dotted line shown in FIG. 5 corresponds to the joining surface of the mold. The joining surface of the mold includes a convex surface, a concave surface and a boundary surface. All the convex surfaces and all the concave surfaces have equal areas. All the convex surfaces have a height of 0.4 mm from an equatorial plane. Accordingly, the mold has a maximum step of 0.8 mm. The number of convex sections in each of the upper and lower portions is equal to the number of units per hemisphere (that is, five) The golf ball is molded by injection molding. The mold includes ten gates for injecting a molding material. All the gates are provided in a position where the boundary surface crosses the equatorial plane.

Three dimples X, Y and Z are present in a portion corresponding to each convex section. The dimples X and Z are provided in positions which are geometrically equivalent to each other, and are the B dimples having a diameter of 3.80 mm. The dimples X and Z are formed by a projection provided in contact with the convex surface. The dimple Y is the C dimple having a diameter of 3.35 mm. The dimple Y is formed by a projection crossing the convex surface. A distance between the center of the projection forming the dimple Y and the convex surface is 1.52 mm and is 0.91 time as great as the radius of the C dimple. Such a golf ball has no great circle path.

The diameter of the dimple to be formed on the golf ball is not particularly restricted but is usually set to 2.0 mm to 5 mm, and particularly, 2.5 mm to 4.5 mm. A non-circular dimple may be provided in place of a circular dimple or together therewith. In the case of the non-circular dimple, the diameter of a circle having a minimum diameter which includes the non-circular dimple is set to be a dimple diameter for convenience.

The diameter of the golf ball is usually set to 40 mm to 45 mm, furthermore 42 mm to 44 mm, and particularly, 42.67 mm to 42.80 mm.

EXAMPLES

Example

A mold including upper and lower portions was prepared, each of the upper and lower portions having five convex sections. A core formed of a solid rubber was put in the mold and an ionomer resin composition was injected around the core through ten gates, and a cover was thus formed. The surface of the cover was coated so that a golf ball according to an example which has a dimple pattern shown in a plan view of FIG. 4 and a front view of FIG. 5 was obtained. The golf ball had a diameter of approximately 42.7 mm and a compression (which is an amount of deformation from a stage in which an initial load of 98 N is applied to a stage in which an ultimate load of 1275 N is applied) of approximately 3.00 mm. Moreover, the total volume of dimples of the golf ball (the sum of volumes of spaces surrounded by planes including the contour of the dimples and dimple surfaces) was approximately 320 $mm^3$.

Comparative Example

Figure 6:
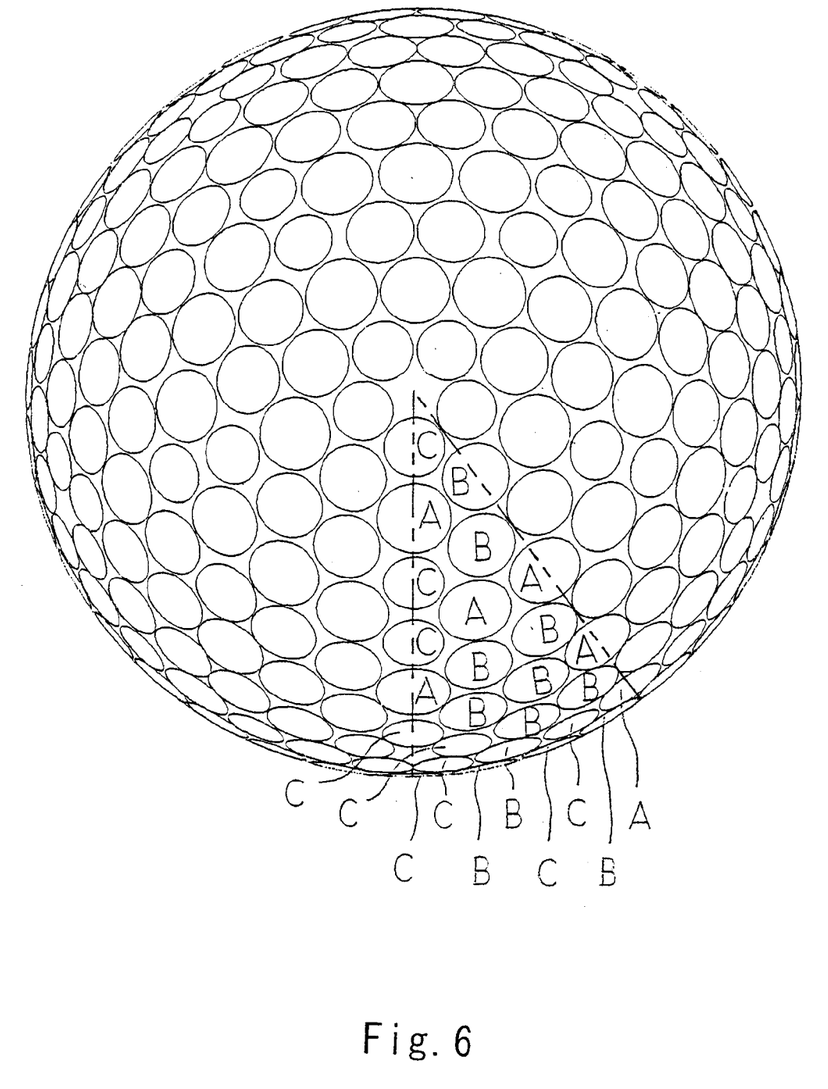
FIG. 6 is a plan view showing a golf ball according to a comparative example of the present invention.
Figure 7:
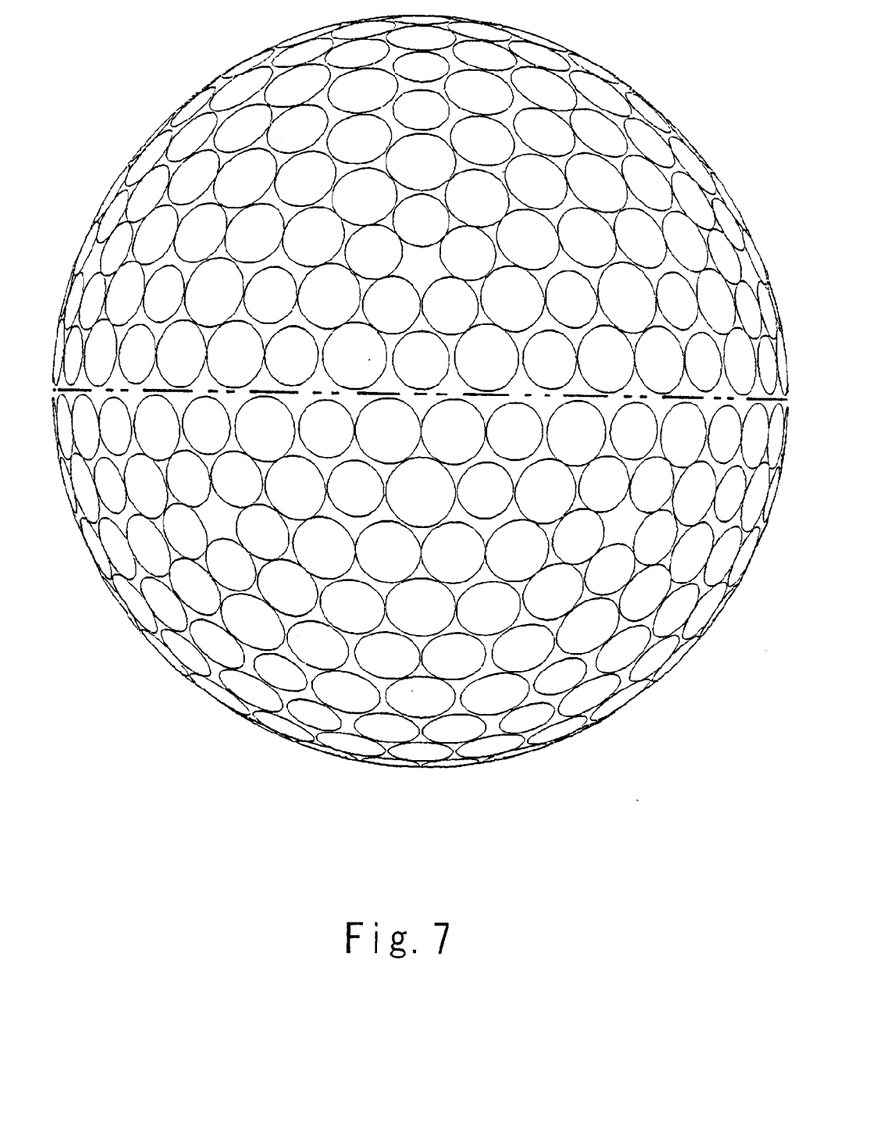
FIG. 7 is a front view showing the golf ball of FIG. 6.

A golf ball according to a comparative example which has a dimple pattern shown in a plan view of FIG. 6 and a front view of FIG. 7 was obtained in the same manner as that in the example except that a mold was changed. The mold includes upper and lower portions having semispherical cavities respectively, and the joining surface of the upper and lower portions is flat. A two-dotted line shown in FIG. 7 corresponds to the joining surface. Moreover, the number of gates is ten. The dimple pattern of the golf ball is provided by a hemisphere repetition arranging method and the number of units per hemisphere is five. The golf ball has 70 A dimples having a diameter of 4.1 mm, 210 B dimples having a diameter of 3.80 mm and 130 C dimples having a diameter of 3.35 mm in the same manner as the golf ball according to the example. The golf ball includes one great circle path. The great circle path is present in a portion corresponding to an equator E. A portion shown in the two-dotted line of FIG. 7 indicates the great circle path.

Flight Distance Test

A driver (W#1) having a metal head attached thereto was fixed to a swing robot produced by True Temper Co. and conditions were set to obtain a head speed of approximately 49 m/s. Next, 40 golf balls according to each of the example and the comparative example were prepared and were hit to measure a flight distance (carry). Also in the example and the comparative example, 20 golf balls were hit such that an equator E acts as the highest speed portion of a back spin and residual 20 golf balls were hit such that a longitude acts as the highest speed portion of the back spin. In the evaluation, the golf ball had a launch angle of approximately 11 degrees and a back spin rate of approximately 3000 rpm. Moreover, an almost following wind blew during the evaluation and a mean wind speed was approximately 1 m/s. The mean value of the flight distance is shown in Table 1 which will be described below.

TABLE 1

Result of flight distance test

| | | Example | Com. Ex. |
|---|---|---|---|
| Joining surface of mold | | concavo-convex | flat |
| Number of great circle paths | | none | one |
| Plan view | | FIG. 4 | FIG. 6 |
| Front View | | FIG. 5 | FIG. 7 |
| Flight distance | Coincidence of highest speed portion with equator (m) | 230.5 | 228.1 |
| | Coincidence of highest speed portion with longitude (m) | 231.3 | 230.1 |
| | Difference (m) | 0.8 | 1.9 |

It is apparent from the Table 1 that the golf ball according to the example has a smaller difference in a flight distance based on a hitting position than that in the golf ball according to the comparative example. Moreover, it is also apparent that the golf ball according to the example has a greater flight distance than that of the golf ball according to the comparative example. From the result of the evaluation, the advantage of the present invention is apparent.

The above description is only illustrative and can be variously changed without departing from the scope of the present invention.

What is claimed is:

1. A golf ball mold comprising upper and lower portions having a large number of projections for dimple formation on cavities thereof, wherein each of the upper and lower portions includes a convex section and a concave section which are alternately provided such that a joining surface to the other has a concavo-convex shape, each of the numbers of the convex sections of the upper portion, the concave sections of the upper portion, the convex sections of the lower portion and the concave sections of the lower portion is three to five, each of the convex sections has two to eight projections on a first line from the joining surface, and at least one of the projections on the first line from the joining surface in each of the convex sections is constituted such that an equation (I) is established:

$$R \times 0.8 \leq L \leq R \times 1.2 \qquad (I)$$

(In the equation (I), R represents a radius of the projection and L represents a linear distance in a vertical direction between a center of the projection and the joining surface).

2. The golf ball mold according to claim 1, wherein the projection is provided such that a surface of a golf ball to be molded has no great circle path.

3. The golf ball mold according to claim 1, wherein a gate for injecting a molding material is provided in a position where the joining surface crosses an equatorial plane.

4. The golf ball mold according to claim 1, wherein a joining surface to the other in each of the upper and lower portions has a convex surface present in the convex section in almost parallel with an equatorial plane, a concave surface present in the concave section in almost parallel with the equatorial plane, and a boundary surface positioned between the convex surface and the concave surface, and all the convex surfaces have areas equal to each other, all the concave surfaces have areas equal to each other, and the convex surface and the concave surface have areas equal to each other.

5. The golf ball mold according to claim 1, wherein a difference in a height between the highest convex section and the lowest concave section is 2.0 mm or less in each of the upper and lower portions.

* * * * *